US008447782B1

(12) United States Patent
Vipul et al.

(10) Patent No.: US 8,447,782 B1
(45) Date of Patent: May 21, 2013

(54) DATA ACCESS LAYER HAVING A MAPPING MODULE FOR TRANSFORMATION OF DATA INTO COMMON INFORMATION MODEL COMPLIANT OBJECTS

(75) Inventors: Utkarsh Vipul, Mansfield, MA (US); Lorenzo Bailey, Framingham, MA (US); Ken Kim, Worcester, MA (US); Yong Wang, Westborough, MA (US); Xuan Tang, Hopkinton, MA (US); Muhamad Djunaedi, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 350 days.

(21) Appl. No.: 12/969,893

(22) Filed: Dec. 16, 2010

(51) Int. Cl.
*G06F 7/00* (2006.01)
*G06F 17/30* (2006.01)

(52) U.S. Cl.
USPC ........................................................ 707/790

(58) Field of Classification Search
None
See application file for complete search history.

(56) References Cited

U.S. PATENT DOCUMENTS

| 6,272,495 | B1 * | 8/2001 | Hetherington | 1/1 |
| 7,870,117 | B1 * | 1/2011 | Rennison | 707/706 |
| 2009/0164972 | A1 * | 6/2009 | Ruan et al. | 717/108 |
| 2010/0313182 | A1 * | 12/2010 | Chen et al. | 717/109 |

OTHER PUBLICATIONS

"CQL: Contextual Query Language (SRU Version 1.2 Specifications)." Aug. 22, 2008. http://www.loc.gov/standards/sru/specs/cql.html, visited on Jun. 8, 2009.

* cited by examiner

*Primary Examiner* — Pierre Vital
*Assistant Examiner* — Taelor Kim
(74) *Attorney, Agent, or Firm* — BainwoodHuang

(57) ABSTRACT

In a storage processor having a provider framework, one embodiment is directed to a method for providing an object. The method includes receiving, by a data access layer of the provider framework, an object request from a client device, the object request identifying at least one object. The method includes applying, by the data access layer, a mapping module to the object request to access object data associated with the object request. The method includes generating, by the data access layer, the at least one object identified in the object request. The method includes forwarding, by the data access layer, the at least one object to the client device.

15 Claims, 5 Drawing Sheets

DATA ACCESS LAYER HAVING A MAPPING MODULE FOR TRANSFORMATION OF DATA INTO COMMON INFORMATION MODEL COMPLIANT OBJECTS

BACKGROUND

A typical data storage system stores data for one or more external client devices. Conventional data storage systems typically include a storage processor and an array of disk drives electrically attached to the storage processor. The storage processor includes one or more ports, such as fibre channel ports, that allow the client devices to connect to the storage processor and is typically configured to perform load and store operations on the array of disk drives on behalf of the client devices.

Conventional data storage systems also allow a management device to manage, monitor, and configure the data storage system according to a system manager's needs. In order for the management device to obtain information regarding certain aspects of the data storage system, the client device can issue a request for certain Common Information Model (CIM) objects maintained by the data storage system. Conventional data storage systems use the CIM to represent elements of the data storage system. For example, CIM objects can represent disk drives, logical units (LUs), Redundant Array of Independent Disks (RAID) groups, and data storage subsystems within the data storage system.

In conventional data storage systems, a storage processor executes a data storage management application and stores data for the CIM objects in memory as part of a provider layer of the data storage management application. During operation, when the management device requests a CIM object from the data storage system, the storage processor retrieves the stored CIM object data from the provider layer, as well as data from lower layers, such as an administration layer and driver layer associated with the data storage management application. The storage processor further retrieves mapping information, hard-coded as part of the storage processor and applies the mapping information to the retrieved data to convert the data into a CIM object, as requested. The storage processor then transmits the CIM object to the management device in response to the request.

SUMMARY

Conventional data storage systems suffer from a variety of deficiencies. In conventional data storage systems, a storage processor stores data for the processed objects in memory using C++ objects. Conventional storage processors are hard coded with mapping instructions indicating the conversion process to retrieve the data from lower layers in memory and convert the data into CIM compliant objects. Accordingly, every CIM object managed by the storage processor is processed and stored in a state readily consumable by clients at all times, even if no client had requested that object. Such storage is an inefficient use of the storage processor's memory resources. Further, the processed objects require a relatively large amount of memory. Accordingly, in the conventional storage processor configuration, the storage processor can support only a limited number of objects associated with the data storage system. Additionally, with the relatively large amount of memory used to store the processed objects, object update and retrieval requires a relatively large amount of time and CPU processing.

Furthermore, the storage processor requires separate data storage management application modules having custom code that perform the mapping between data from lower layers to CIM objects. Without a generic method to map between the lower layers and CIM objects, on a relatively large scale, changes in data storage management application modules typically require extensive changes in the code which can be time consuming.

By contrast to conventional data storage systems, embodiments of the invention relate to a data access layer having a mapping module for transformation of data into CIM compliant objects. A disk processor executes a provider framework having an object data database, such as retrieved from an administration layer, which, in turn, stores raw data as retrieved from a driver layer. A data access layer of the provider framework includes a mapping module configured to apply a generic mapping technique to the object requests and specifies how the requested objects map to the database. For example, the mappings are stored in Extensible Markup Language (XML) files, and the data access layer processes these XML files at system start-up and builds an in-memory representation of the data stored in XML files. Subsequently, when the data access layer receives object requests to retrieve objects, the data access layer processes its in-memory representation of the mapping to generate Structured Query Language (SQL) queries for the database. The data access layer then executes the queries and packages the results as CIM compliant objects which are then returned as the response to the object requests. With such a configuration, the single data access layer module is configured to handle all retrieval requests.

Accordingly, with use of the data access layer and associated mapping module, the data access layer only builds CIM objects that are requested, thus avoiding unnecessary processing. Also, because the provider framework stores the database, which has minimal redundancies, the provider framework reduces the memory requirements for storing objects, therefore allowing management of a larger number of objects. Furthermore, the provider framework which provides object retrieval and mapping is centralized, thereby minimizing the amount of code redundancy found in conventional systems. Additionally, because the provider framework provides a generic method to map between the lower layers and CIM objects, on a relatively large scale, changes in data storage management application modules do not require extensive changes in the code.

In a storage processor having a provider framework, one embodiment is directed to a method for providing an object. The method includes receiving, by a data access layer of the provider framework, an object request from a client device, the object request identifying at least one object. The method includes applying, by the data access layer, a mapping module to the object request to access object data associated with the object request. The method includes generating, by the data access layer, the at least one object identified in the object request. The method includes forwarding, by the data access layer, the at least one object to the client device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to a data access layer having a mapping module for transformation of data into CIM compliant objects. A disk processor executes a provider framework having a database, such as retrieved from an application layer, which stores raw data as retrieved from a driver layer. A data access layer of the provider framework includes a mapping module configured to apply a generic mapping technique to the object requests and specifies how the requested objects map to the database. For example, the mappings are stored in XML files, and the data access layer processes these XML files at system start-up and builds an in-memory representation of the data stored in XML files. Subsequently, when the data access layer receives object requests to retrieve objects, the data access layer processes its in-memory representation of the mapping to generate SQL queries for the database. The data access layer then executes the queries and packages the results as CIM compliant objects which are then returned as the response to the object requests. With such a configuration, the single data access layer module is configured to handle all retrieval requests.

Figure 1:
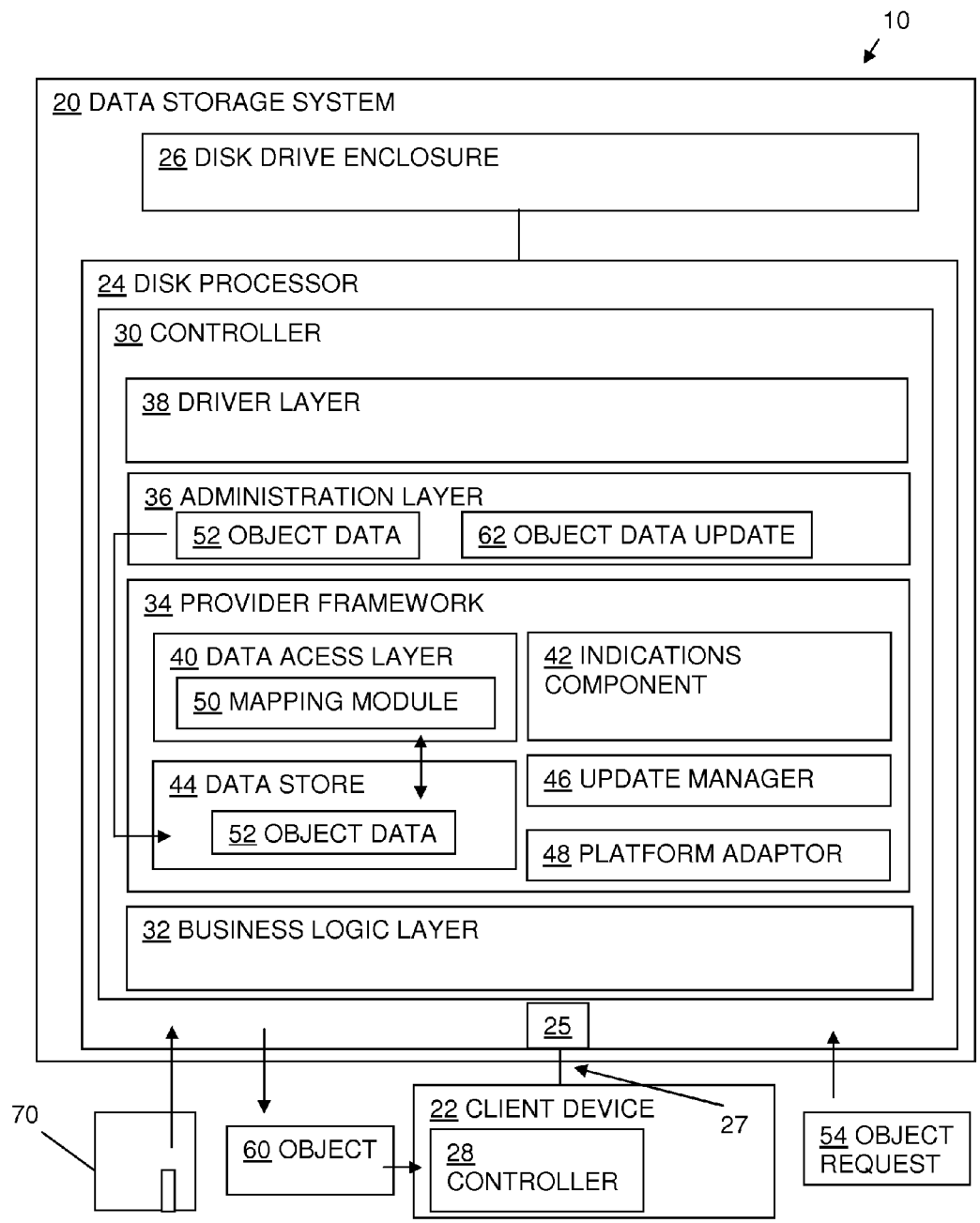
FIG. 1 illustrates a schematic representation of a data storage system, according to one embodiment.

FIG. 1 illustrates an example arrangement of a data storage environment 10, such as used by an enterprise. As shown, the data storage environment 10 includes a data storage system 20 having a disk processor 24 and a set of disk drive enclosures 26. The data storage environment 10 also includes a client device 22 disposed in electrical communication with the data storage system 20.

The client device 22, such as a computerized device, includes a controller 28, such as a memory and a processor. The controller 28 is configured to execute a management application, such as produced by EMC Corporation of Hopkinton, Mass., to manage the data storage system 20. For example, the management application can be a Navisphere Manager application or a Unisphere application configured to manage and monitor the data storage system 20. In another example, the management application 34 can be an NST application or a Unisphere Service Manager (USM) application configured to update, install, and maintain hardware and applications associated with the data storage system 20.

The client device 22 is disposed in electrical communication with a communications interface 25 of the data storage system 20 via a storage interconnect 27. For example, the storage interconnect 27 can be a shared, public, or private network and encompasses a wide area or local area and can be implemented through any suitable combination of wired and/or wireless communication networks. Furthermore, the storage interconnect 27 can include a LAN, a WAN, an intranet, the Internet, or a set of switches. For example, in one embodiment, the storage interconnect 27 works with Fibre Channel connectivity and is implemented in the form of a storage area network (SAN). In another embodiment, the storage interconnect 27 works with internet protocol (IP) connectivity and is implemented via an Internet-Small Computer System Interface (iSCSI) (e.g., for Fibre Channel). Those of skill in the art will recognize that other implementations are possible.

The disk processor 24 includes a controller 30, such as a processor and memory, configured to perform load and store operations on the disk drive enclosures 26 on behalf of a host device (not shown). For example, each of the disk drive enclosures of the set of disk drive enclosures 26 includes an array of memory units, such as tape drives or disk drives operable to store data received from, or to provide data requested from, the disk processor 24. Examples of memory unit arrays include the Symmetrix Integrated Cache Disk Array System and the CLARiiON Disk Array System, both available from EMC Corp. of Hopkinton, Mass. Each of the disk drive enclosures 26 includes ports that allow for electrical connections to be provided among the set of disk drive enclosures 26 and with the disk processor 22.

The controller 30 of the disk processor 24 is further configured to generate objects for display by a user interface (UI) associated with the client device and in response to receiving one or more object requests 54 from the client device 22. An object is a representation of a logical or a physical location of data in the data storage system 20. Any object in the data storage system 20 may be categorized into a CIM class which relates to the type of element that any given object represents. CIM classes of objects can include subsystem, host, folder, logical unit number (LUN), disks, fans, link control cards (LCCs), power supply, storage processor, RAID group, and storage group classes, for example. By providing the generated objects to the client device 22, the disk processor 24 provides the client device 22 with the ability to manage the data storage system 20.

In one arrangement, the disk processor 24 stores a provider framework application. The provider framework application installs on the controller 30 of the disk processor 24 from a computer program product 70. In some arrangements, the computer program product 70 is available in a standard off-the-shelf form such as a shrink wrap package (e.g., CD-ROMs, diskettes, tapes, etc.). In other arrangements, the computer program product 70 is available in a different form, such downloadable online media. When performed on the controller 30 of the disk processor 24, the provider framework application causes the disk processor 24 to receive raw object data and build objects for display by a UI of the client device 22.

In one arrangement, the controller 30 of the disk processor 24 executes a provider framework 34, in conjunction with a variety of framework layers, to build objects for display by a UI. For example, as illustrated, the controller 30 of the disk processor 24 executes a business logic layer 32, the provider framework 34, an administration layer 36, and a driver layer 38 to build the objects in an on-demand manner.

The business logic layer 32 is configured to handle information exchange between the provider framework 34 and a user interface of the client device 22. For example, the business logic layer 32 is configured to receive object requests 54 from the client device 22 and deliver the object requests 54 to the provider framework 34. The business logic layer 32 is also configured to receive objects 60 from the provider framework 34, in response to the object requests 54, and provide the objects 60 to the client device 22 for display by the UI of the client device 22.

The administration layer 36, in one arrangement, is configured to provide an interface between the provider framework 34 and the driver layer 38. For example, the administration layer 36 retrieves raw data from the driver layer 38 and provides the data as object data 52 to the provider framework 34. The administration layer 36 is configured to store object data used by the provider framework 34 to build objects. For example, the administration layer 36 stores the object data 52 on the disk arrays of the disk drive enclosures 26. With such a configuration, the administration layer 36 minimizes or eliminates the requirement for the object data 52 to be maintained within disk processor 24 memory at all times and allowing the provider framework 34 to provide CIM-compliant objects 60 on-demand.

The provider framework 34 is configured as a distinct layer from, and a common layer to, the business logic layer 32, the administration layer 36, and the driver layer 38. As indicated above, the provider framework 34 is configured to build objects in response to receiving an object request 54 from the client device 22. The provider framework 34, in one arrangement, includes a data access layer 40, an indications component 42, a data store 44, an update manager 46, and a platform adaptor 48.

The update manager 46 and the platform adaptor 48 are collectively configured to update object data 52 stored as part of the administration layer 36. For example, in response to receiving object data from an external source, the update manager 46, in conjunction with the platform adaptor forwards an object data update 62 to the administration layer 36.

Figure 3:
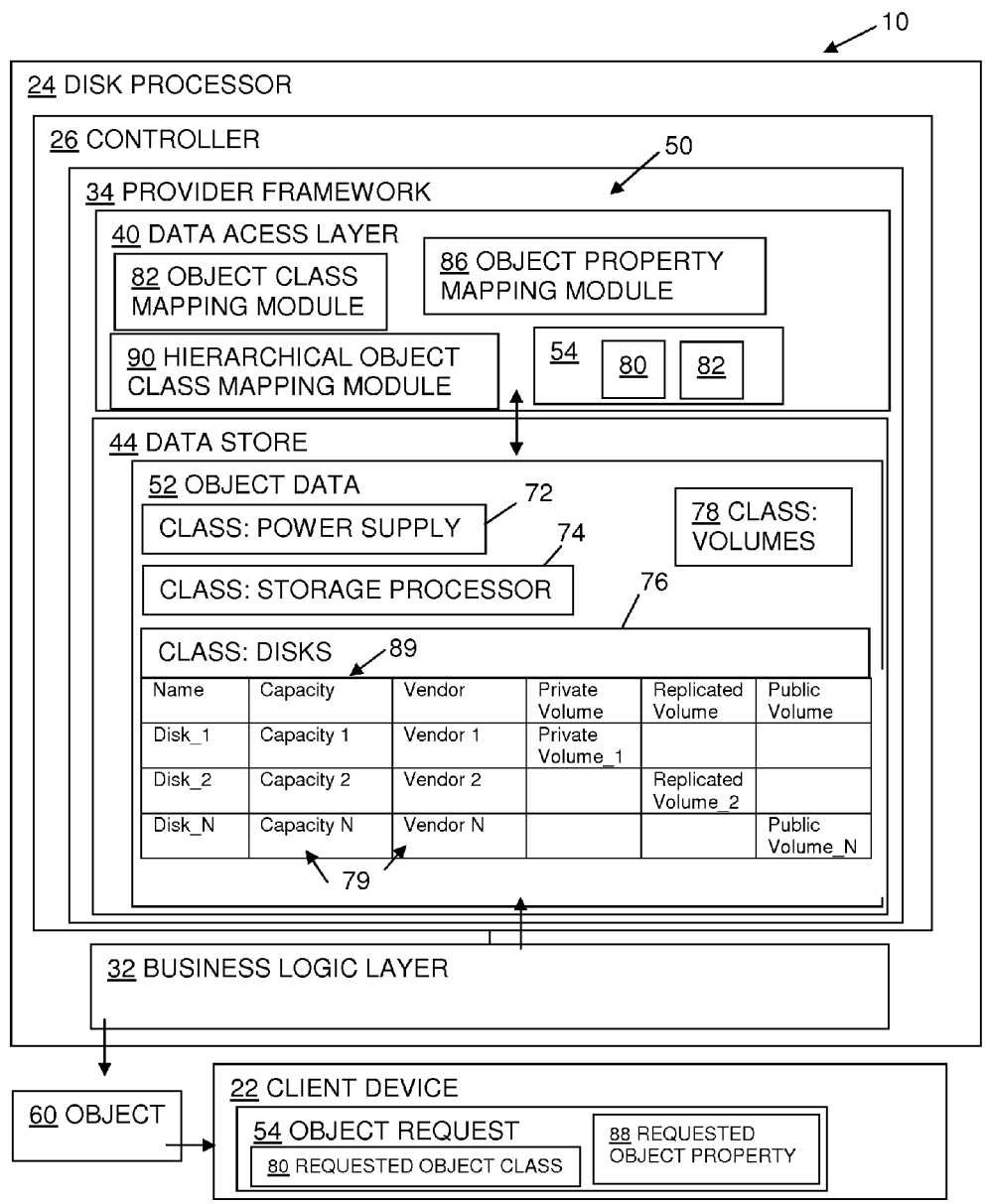
FIG. 3 illustrates a schematic representation of a provider framework of the disk processor of FIG. 1.

The data store 44 is configured to store object data 52 retrieved from the administration layer 36. For example, the indications component 42 is configured to read the object data 52 from the administration layer 36 and associate the retrieved object data 52 with the data store 44. In one arrangement, the data store 44 stores the object data 52 in a raw format. For example, with reference to FIG. 1, at start-up, the provider framework 34 retrieves a set of object data 52 from the administration layer 36 and stores the object data 52 as part of the data store 44. In one arrangement and as illustrated in FIG. 3, the object data 52 is configured as a set of tables, each table corresponding to a particular object class. For example, as illustrated the object data 52 includes a power supply class 72, a storage processor class 74, a disk class 76, and a volume class 78 with each class having a variety of properties 79.

The data access layer 40 is configured to build CIM compliant objects 60 in an on-demand manner, based upon object requests 54 received from the client device 22. In one arrangement, the data access layer 40 is configured with one or more mapping modules 50 that define a relationship between an object request 54, as received from the client device 22, and object data 52, stored as one or more tables by the data store 44. While the mapping modules 50 can be configured in a variety of formats, in one arrangement, the mapping modules are configured as XML files.

Figure 2:
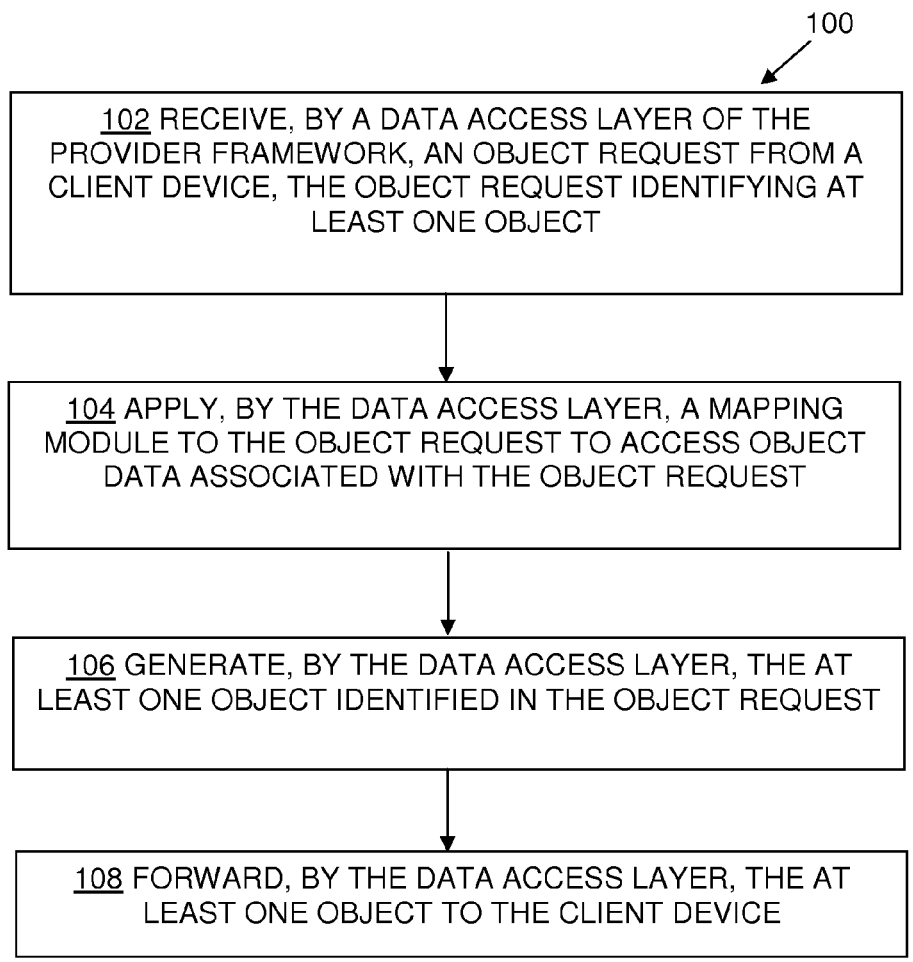
FIG. 2 is a flowchart that illustrates a procedure performed by a disk processor of the data storage system of FIG. 1.

As indicated above, the client device 22 is configured to transmit object requests 54 to the data storage system 20, and specifically to the disk processor 24, to ascertain the status of various components of the data storage system 20 or to otherwise manage the data storage system 20. Based upon the object requests 54, the data access layer 40 of the disk processor 24 develops, in an on-demand manner, objects 60 associated with the object requests 54 and forwards the objects to the client device 22. FIG. 2 is a flowchart that illustrates a procedure performed by the disk processor 24 of the data storage system 20 when providing an object 60.

In step 102, the data access layer 40 of the provider framework 34 receives an object request 54 from a client device 22, the object request 54 identifying at least one object. For example, with reference to FIG. 3, assume a user wants to retrieve information regarding one or more classes of objects, such as all disk objects, associated with the data storage system 20. The user causes the client device 22 to transmit an object request 54 having a requested object class 80 (i.e., the disk class 76) to the data storage system 22 in order to retrieve the class of disk objects. The business logic layer 32 of the disk processor 24 receives the object request 54 from the client device 22 over interconnect 27 and communications interface 25 and forwards the object request 54 to the data access layer 40 of the provider framework 34.

Returning to FIG. 2, in step 104, the data access layer 40 applies a mapping module 50 to the object request 54 to access object data 52 associated with the object request 54. As indicated above and with reference to FIG. 3, at start-up the data access layer 40 processes the mapping modules 50. For example, the object request to object data mappings are stored in XML files as mapping modules 50. The data access layer 40 processes the mapping modules 50 and builds an in-memory representation of the data stored in XML files, such as the object class mapping module 82, the object property mapping module 86, and the hierarchical object class mapping module 90.

When the data access layer 40 receives the object request 54, in order to access the appropriate mapping module 50, the data access layer 40 detects a subject of the object request 54. For example, assume the object request 54 includes a requested object class 80, such as a requested disk object class. When the data access layer 40 detects the object request 54 includes the requested object class 80, the data access layer 40, in response, processes its in-memory representation of the corresponding object class mapping module 82, in this case a disk object class mapping module. Because the object class mapping module 82 is preconfigured to map object class requests to the disc class object data 76, as the data access layer 40 processes the object class mapping module 82, the data access layer 40 generates SQL queries for the disk class table 76 maintained by the data store 44. For example, data access layer 40 executes an SQL SELECT statement to retrieve disk class object data 76 from the data store 44.

Returning to FIG. 2, in step 106, the data access layer 40 generates at least one object identified in the object request 54. For example, based upon the SQL queries to the disk class table 76, the data access layer 40 receives disk object data 76 associated with the requested disk object class 80, as well as particular calls, such as a get name call, a get operation status call, and a get firmware version call, associated with the display of the requested disk object. The data access layer 40 packages these elements as one or more CIM compliant disk objects 60.

In step 108, the data access layer 40 forwards the object to the client device 22. For example, the data access layer 40 provides the CIM compliant disk object 60 through the provider framework 34 to the business logic layer 32. The business logic layer 32, in turn forwards the disk object 60 the client device 22 for display by an associated UI. With requested disk object 60 displayed by the UI, the end user of the client device 22 can utilize the disk object 60 to manage data storage system 20.

Accordingly, the data access layer 40 and associated mapping module 50 only builds CIM compliant objects 60 that are requested by a client device, thus avoiding unnecessary processing. Also, because the provider framework 34 stores the object data 52 as part of the data store 22, the provider framework 34 minimizes the amount of memory utilized by the controller 26 used for storing objects 60, thereby allowing management of a larger number of objects. Furthermore, the provider framework 34 is centralized relative to the business logic layer 32, thereby minimizing the amount of code redundancy found in conventional systems.

As indicated above, the data access layer 40 can be configured to provide a variety data mappings, based upon the object request 54. In one arrangement, with reference to FIG. 3, the object request 54 can include a requested object property 88, such as a request for all system elements of a particular vendor. When the data access layer 40 detects the requested object property 88 as part of the object request 54, the data access layer 40 applies an object property mapping module 86 to the object request 54. For example, the data access layer 40 processes its in-memory representation of the vendor object property mapping module 86. As a result of application of the object property mapping module 86 to the request 54, the data access layer 40 generates a CIM compliant object 60 associated with the requested object property, in this case a vendor property.

Figure 4:
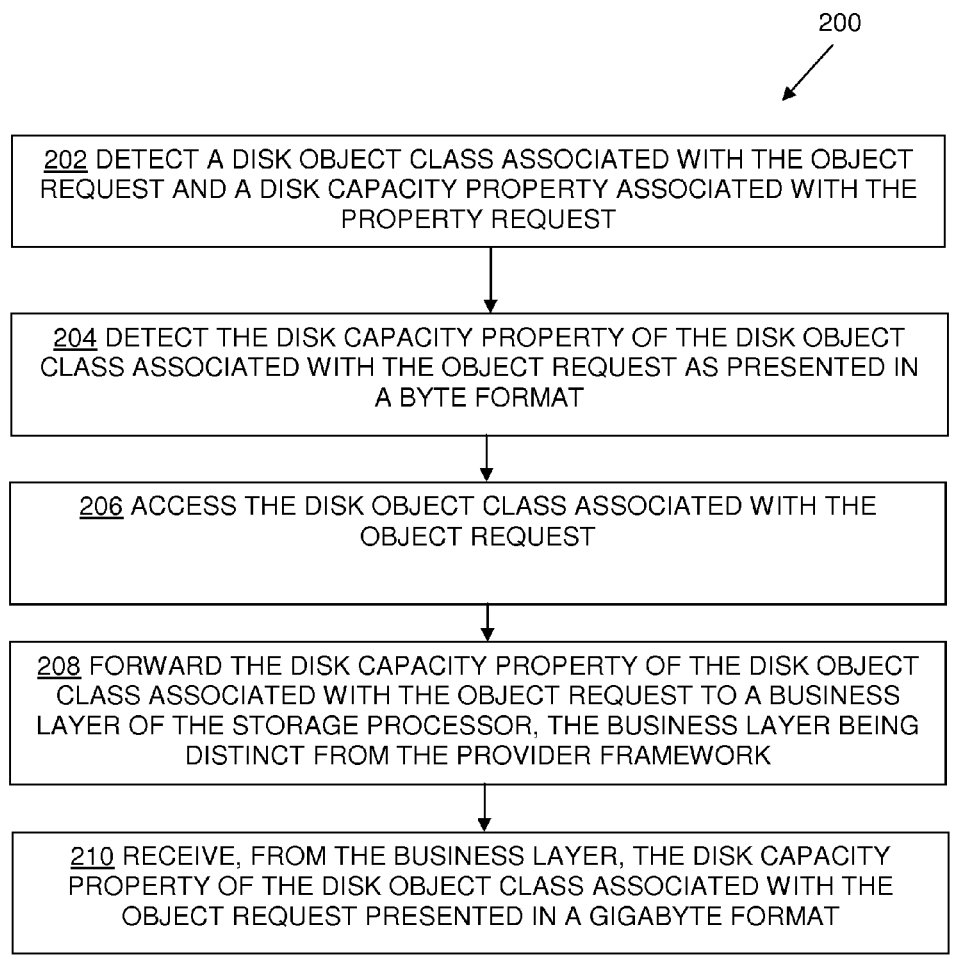
FIG. 4 is a flowchart that illustrates a procedure performed by the disk processor of the data storage system of FIG. 1.

In another arrangement, with continued reference to FIG. 3, the object request 54 can include both a requested object class 80 and a requested object property 88, such as an object request 54 for all disks (object class) having a particular disk capacity (object property). FIG. 4 is a flowchart 200 that illustrates a procedure performed by the data access layer 40 in response to such a request.

In step 202, the data access layer 40 is configured to detect a disk object class 80 associated with the object request 54 and a disk capacity property 88 associated with the object request 54. In response, the data access layer 40 applies both the object class mapping module 82 and the object property mapping module 86 to the object request 54. For example, once the data access layer 40 detects the requested disk object class 80 as part of the object request 54, the data access layer 40 processes its in-memory representation of the corresponding object class mapping module 82, in this case a disk object class mapping module, to retrieve disk class object data 76 from the data store 44. Next, based upon the requested disk capacity property 88, the data access layer 40 applies the object property mapping module 86 to the requested object property 88 associated with the requested object class 89 to access object data associated with the requested object property. For example, with reference to FIG. 3, the data access layer 40 processes its in-memory representation of the corresponding disk capacity object property mapping module 86 to retrieve disk capacity property data 89 associated with the disk class object data 76 retrieved from the data store 44.

In step 204, the data access layer 40 detects the disk capacity property of the disk object class 76 associated with the object request 54 as presented in a byte format. Typically the data store 44 maintains the disk capacity data in a byte format. For example, in FIG. 3, the disk Disk_1 can have a Capacity 1, equal to 5 Gigabytes. Accordingly, the data store 44 maintains the disk capacity property data 89 as 5,000,000,000 bytes.

In step 206, the data access layer 40 forwards the disk capacity property 89 of the disk object class 76 associated with the object request 54 to the business logic layer 32 of the storage processor 24, the business logic layer 32 being distinct from the provider framework 34. For example, presentation of the disk capacity property data 89 in byte format can be confusing to an end user. Accordingly, data access layer 40 forwards the disk capacity property data 89 to the business logic layer 32 to have the business logic layer 32 convert the format of the disk capacity property data 89 from byte format to gigabyte format.

In step 208, the data access layer 40 receives, from the business logic layer 32, the disk capacity property 89 of the disk object class 76 associated with the object request 54 presented in a gigabyte format. With the disk capacity property 89 being presented in the gigabyte format, the data access layer 40, in turn, generates an object 60 in response to the object request 54 where the object 60 presents the disk capacity property information to an end user via a UI in the gigabyte format.

Returning to FIG. 3, in one arrangement, the data access layer 40 can receive, as part of an object request 54, a requested object property that is common among a set of object properties for a given requested object class. For example, the object request 54 can include a request for information regarding the volumes (i.e., object property) associated with a disk class (i.e., object class). As illustrated in FIG. 3, for the disks listed in disk object class 76, none of the disks have a generic volume property. However, the disk object class 76 includes a private volume property, a replicated volume property, and a public volume property.

Accordingly, in one arrangement, when the data access layer 40 receives an object request 54, the data access layer 40 is configured to detect the request 54 as having a requested object class, such as the disk object class 76, and a requested object property that is common to a plurality of object properties within the object class 76. Based upon such detection, the data access layer 40 applies the object class mapping module 82 to the object request 54 as well as a hierarchical object class mapping module 90 to the object request 54. The hierarchical object class mapping module 90 defines an association between a requested generic object property, in this case the property of "volumes," with each specific volume property associated with the disk object class 76, in this case the private volume property, the replicated volume property, and the public volume property. Accordingly, the hierarchical object class mapping module 90 directs the data access layer 40 to provide the correct object properties in an object response 60 based upon a generic object property included in the object request 54.

Figure 5:
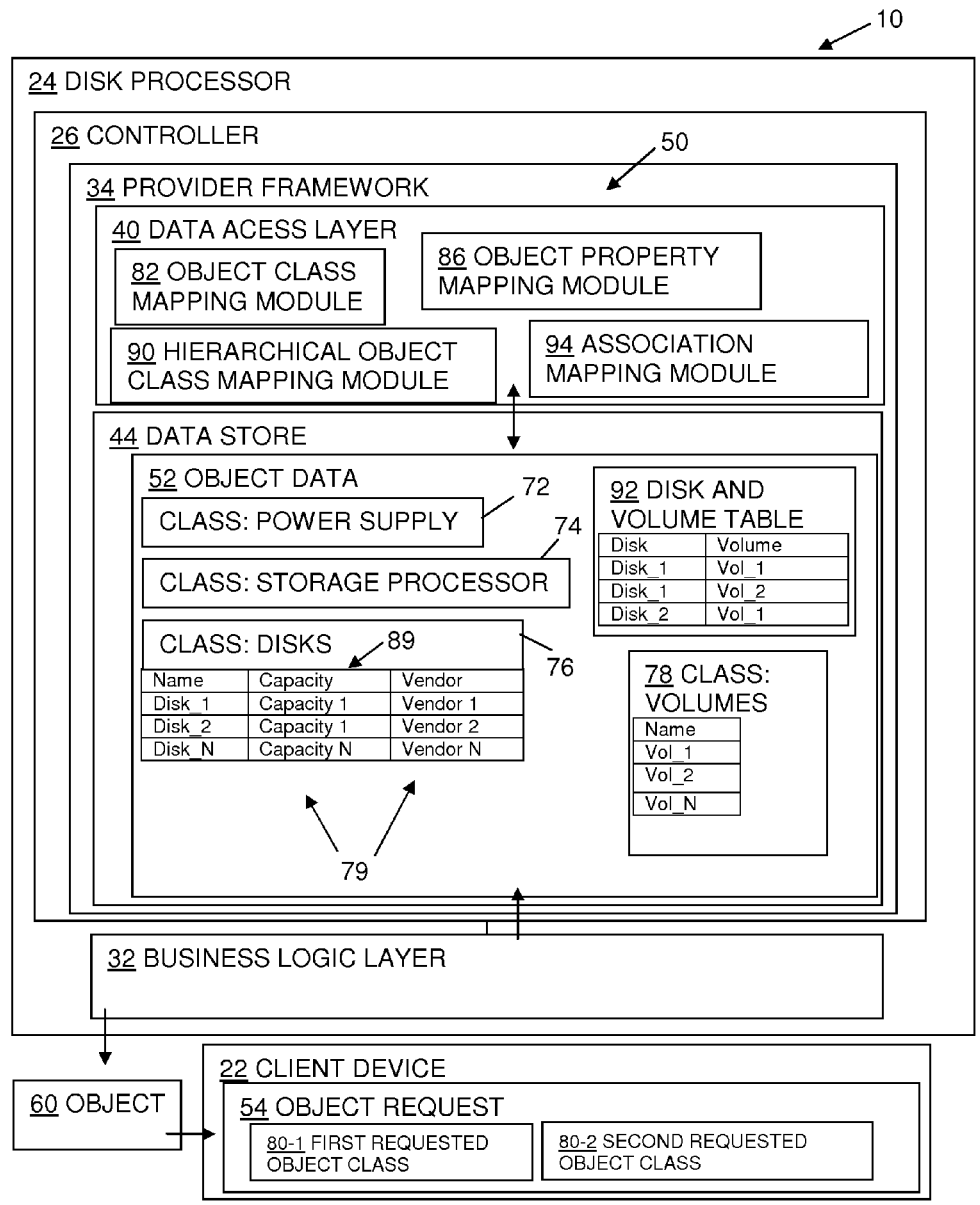
FIG. 5 illustrates a schematic representation of a provider framework of the disk processor of FIG. 1.

With reference to FIG. 5, in one arrangement, the data access layer 40 can receive, as part of an object request 54, a first requested object class 80-1 and a second requested object class 80-2. For example, the object request 54 can include a request for the volumes (i.e., the first requested object class 80-1) defined on a disk of the data storage system 20. In response to receiving such a request, the data access layer 40 applies an association mapping module 94 to the object request 54 to associate the first requested object class 80-1 with the second requested object class 80-1.

With continued reference to FIG. 5, in the case where the data access layer 40 processes its in-memory representation of the association mapping module 94, the association mapping module 94 is configured to direct the data access layer 40 to a data and volume table 92 which lists an association between the disks of a disk object class 76 and the volumes of a volume class 78. For example, Disk_1 includes both Vol_1 and Vol_2. The disk and volume table 92 links or associates the disk object class data 76 to the object volume data 78 carried by the data store 44. Based upon such an association, the data access layer 40 can access the disk object class data 76 and the object volume data 78 to retrieve the requested volume information for a particular disk of the data storage system 20 for the requested disk class.

While various embodiments of the invention have been particularly shown and described, it will be understood by those skilled in the art that various changes in form and details may be made therein without departing from the spirit and scope of the invention as defined by the appended claims.

For example, as indicated above, the data access layer 40 utilizes a hierarchical object class mapping module 90 that defines an association between a requested generic object property, in this case the property of "volumes," with each specific volume property associated with the disk object class 76, in this case the private volume property, the replicated volume property, and the public volume property. Accordingly, the hierarchical object class mapping module 90 directs the data access layer 40 to provide the correct object properties in an object response 60 based upon a generic object property included in the object request 54. Such indication is by way of example only. In one arrangement, the hierarchical object class mapping module 90 defines an association between a requested generic object property, in this case the property of "volumes," with each specific volume property associated with a volume table. For example, assume a volume table listing different types of volumes, such as such as private, public, mapped, and replicated volumes, associated with the data storage system 20. Further assume the data access layer 40 receives a request 54 for all mapped volumes. Based upon the request, the hierarchical object class mapping module 90 selects all mapped volumes (e.g., all volumes of the volume table that have an "IsMapped" column marked as "true") from the volume table directs the data access layer 40 to provide the mapped volumes as part of an object response 60 to the object request 54.

What is claimed is:

1. A method for providing an object in a provider framework comprising:
　receiving, by a data access layer of the provider framework, an object request from a client device, the object request identifying at least one object;
　applying, by the data access layer, a mapping module to the object request to access object data associated with the object request;
　generating, by the data access layer, the at least one object identified in the object request;
　forwarding, by the data access layer, the at least one object to the client device;
　wherein the method further comprises:
　　in response to receiving the object request, detecting, by the data access layer, a requested object class associated with the object request and a requested object property associated with the object request;
　wherein applying the mapping module to the object request comprises:
　　applying, by the data access layer, an object class mapping module to the requested object class to access object data associated with the requested object class, and
　　applying, by the data access layer, an object property mapping module to the requested object property associated with the requested object class to access object data associated with the requested object property;
　wherein generating the at least one object identified in the object request comprises generating, by the data access layer, the at least one object identified in the object request based upon the object data associated with the requested object class and based upon the object data associated with the requested object property;
　wherein detecting the requested object class associated with the object request and the requested object property associated with the object request comprises detecting, by the data access layer, a disk object class associated with the object request and a disk capacity property associated with the object request; and
　applying the object property mapping module to the requested object property associated with the requested object class to access object data associated with the requested object property comprises:
　　accessing, by the data access layer, the disk object class associated with the object request;
　　detecting, by the data access layer, the disk capacity property of the disk object class associated with the object request as presented in a byte format;
　　forwarding, by the data access layer, the disk capacity property of the disk object class associated with the object request to a business logic layer of the storage processor, the business logic layer being distinct from the provider framework; and
　　receiving, by the data access layer and from the business logic layer, the disk capacity property of the disk object class associated with the object request presented in a gigabyte format.

2. The method of claim 1, comprises receiving, by a data store associated with the provider framework, a set of object data from an administration layer of the storage processor, the administration layer being distinct from the provider framework, the set of object data including the object data accessed by the data access layer.

3. The method of claim 1, wherein
　the requested object property is common to a plurality of object properties of the requested object class;
　wherein applying the mapping module to the object request further comprises:
　　applying, by the data access layer, a hierarchical object property mapping module to the requested common object property of the requested object class; and
　wherein generating the at least one object identified in the object request further comprises generating, by the data access layer, the at least one object identified in the object request based upon the object data associated with the requested object class and based upon the common object property associated with the requested object property.

4. The method of claim 1, wherein the method further comprises,
　in response to receiving the object request, detecting, by the data access layer, a first requested object class associated with the object request and a second requested object property associated with the object request; and
　applying the mapping module to the object request further comprises applying, by the data access layer, an association mapping module to the object request to associate the first requested object class with the second requested object class.

5. The method of claim 1, comprising updating, by an update manager of the provider framework, the set of object data stored by the administration layer.

6. A disk processor with memory, comprising:
　at least one communications interface; and
　a controller electrically coupled to the at least one communications interface wherein the controller, when executing a provider framework, is configured to:
　　receive, by a data access layer of the provider framework, an object request from a client device via the at least one communications interface, the object request identifying at least one object;
　　apply, by the data access layer, a mapping module to the object request to access object data associated with the object request;
　　generate, by the data access layer, the at least one object identified in the object request; and
　　forward, by the data access layer, the at least one object to the client device;
　wherein, in response to receiving the object request, the controller is configured to detect, by the data access layer, a requested object class associated with the object request and a requested object property associated with the object request;
when applying the mapping module to the object request, the controller is configured to:
  apply, by the data access layer, an object class mapping module to the requested object class to access object data associated with the requested object class, and
  apply, by the data access layer, an object property mapping module to the requested object property associated with the requested object class to access object data associated with the requested object property; and
  when generating the at least one object identified in the object request, the controller is configured to generate, by the data access layer, the at least one object identified in the object request based upon the object data associated with the requested object class and based upon the object data associated with the requested object property;
wherein, when detecting the requested object class associated with the object request and the requested object property associated with the object request, the controller is configured to detect, by the data access layer, a disk object class associated with the object request and a disk capacity property associated with the object request; and
wherein, when applying the object property mapping module to the requested object property associated with the requested object class to access object data associated with the requested object property, the controller is configured to:
  access, by the data access layer, the disk object class associated with the object request;
  detect, by the data access layer, the disk capacity property of the disk object class associated with the object request as presented in a byte format;
  forward, by the data access layer, the disk capacity property of the disk object class associated with the object request to a business logic layer of the storage processor, the business logic layer being distinct from the provider framework; and
  receive, by the data access layer and from the business logic layer, the disk capacity property of the disk object class associated with the object request presented in a gigabyte format.

7. The disk processor of claim 6, wherein the controller is configured to receive, by a data store associated with the provider framework, a set of object data from an administration layer of the storage processor, the administration layer being distinct from the provider framework, the set of object data including the object data accessed by the data access layer.

8. The disk processor of claim 6, wherein
the requested object property is common to a plurality of object properties of the requested object class;
wherein when applying the mapping module to the object data, the controller is configured to
  apply, by the data access layer, a hierarchical object property mapping module to the requested common object property of the requested object class; and
when generating the at least one object identified in the object request, the controller is configured to generate, by the data access layer, the at least one object identified in the object request based upon the object data associated with the requested object class and based upon the common object property associated with the requested object property.

9. The disk processor of claim 6, wherein,
in response to receiving the object request the controller is further configured to detect, by the data access layer, a first requested object class associated with the object request and a second requested object property associated with the object request; and
when applying the mapping module to the object request, the controller is further configured to apply, by the data access layer, an association mapping module to the object request to associate the first requested object class with the second requested object class.

10. The disk processor of claim 6, the controller is configured to update, by an update manager of the provider framework, the set of object data stored by the administration layer.

11. A non-transitory computer program product having a computer-readable medium including computer program logic encoded thereon that, when performed on a controller of a disk processor, causes the disk processor to:
  receive, by a data access layer of a provider framework, an object request from a client device, the object request identifying at least one object;
  apply, by the data access layer, a mapping module to the object request to access object data associated with the object request;
  generate, by the data access layer, the at least one object identified in the object request; and
  forward, by the data access layer, the at least one object to the client device;
wherein, in response to receiving the object request, the computer program logic causes the disk processor to detect, by the data access layer, a requested object class associated with the object request and a requested object property associated with the object request;
when applying the mapping module to the object request, the computer program logic causes the disk processor to:
  apply, by the data access layer, an object class mapping module to the requested object class to access object data associated with the requested object class, and
  apply, by the data access layer, an object property mapping module to the requested object property associated with the requested object class to access object data associated with the requested object property; and
  when generating the at least one object identified in the object request, the computer program logic causes the disk processor to generate, by the data access layer, the at least one object identified in the object request based upon the object data associated with the requested object class and based upon the object data associated with the requested object property;
wherein, when detecting the requested object class associated with the object request and the requested object property associated with the object request, the computer program logic causes the disk processor to detect, by the data access layer, a disk object class associated with the object request and a disk capacity property associated with the object request; and
wherein, when applying the object property mapping module to the requested object property associated with the requested object class to access object data associated with the requested object property, the computer program logic causes the disk processor to:
  access, by the data access layer, the disk object class associated with the object request;
  detect, by the data access layer, the disk capacity property of the disk object class associated with the object request as presented in a byte format;

forward, by the data access layer, the disk capacity property of the disk object class associated with the object request to a business logic layer of the storage processor, the business logic layer being distinct from the provider framework; and receive, by the data access layer and from the business logic layer, the disk capacity property of the disk object class associated with the object request presented in a gigabyte format.

12. The non-transitory computer program product of claim 11, wherein the computer program logic causes the disk processor to receive, by a data store associated with the provider framework, a set of object data from an administration layer of the storage processor, the administration layer being distinct from the provider framework, the set of object data including the object data accessed by the data access layer.

13. The non-transitory computer program product of claim 11, wherein the requested object property is common to a plurality of object properties of the requested object class;

wherein when applying the mapping module to the object data, the computer program logic causes the disk processor to apply, by the data access layer, a hierarchical object property mapping module to the requested common object property of the requested object class; and when generating the at least one object identified in the object request, the computer program logic causes the disk processor to generate, by the data access layer, the at least one object identified in the object request based upon the object data associated with the requested object class and based upon the common object property associated with the requested object property.

14. The non-transitory computer program product of claim 11, wherein, in response to receiving the object request the computer program logic further causes the disk processor to detect, by the data access layer, a first requested object class associated with the object request and a second requested object property associated with the object request; and when applying the mapping module to the object request, the computer program logic further causes the disk processor to apply, by the data access layer, an association mapping module to the object request to associate the first requested object class with the second requested object class.

15. The non-transitory computer program product of claim 11, the computer program logic causes the disk processor to update, by an update manager of the provider framework, the set of object data stored by the administration layer.

* * * * *